FLOATING POINT ARITHMETIC CIRCUIT

Filed April 26, 1961

INVENTOR.
IRVIN V. VOLTIN
BY Marvin Jacobson
AGENT 3,193,669

FLOATING POINT ARITHMETIC CIRCUIT

Irvin V. Voltin, Delano, Minn., assignor to Sperry Rand Corporation, New York, N.Y., a corporation of Delaware Filed Apr. 26, 1961, Ser. No. 105,762
8 Claims. (Cl. 235—164)

This invention relates to computing devices and more particularly to circuits for use in arithmetic sections of computing devices which operate on data in a so-called floating-point format.

In computing devices employing floating-point arithmetic the data or operands upon which arithmetic functions are to be performed are in a format such that one portion of the data word contains the actual information and is called the mantissa whereas another portion of the data word contains the characteristic. The characteristic is used primarily to indicate the relative position of the arithmetic point, such as decimal or binal point, in the information or the data contained in the mantissa. In performing arithmetic operations on data in the floating point format, the actual arithmetic operations are performed on the information contained in the mantissa portion of the data word and the characteristic is used primarily to indicate relative position of the arithmetic point in the information. Some arithmetic operations are performed on the characteristic portion of the operand to determine the characteristic of the result of the arithmetic operation on the mantissa. For example, in adding two operands in floating-point format each having its own characteristic and its own mantissa portions, the arithmetic section of a computing device utilizes the two characteristics to determine the actual digit-by-digit alignment, i.e., to properly align the arithmetic points, of the two mantissas which are to be added. In the adder portion of the computing device the two aligned mantissas are then added together to produce a resulting sum. To preserve a floating-point format the sum of the addition of the mantissas is arranged to be the mantissa of a new data word. The characteristic of the sum is determined from the original two characteristics and additionally by any modification that might have resulted from the addition of the two mantissas.

In computing devices the data words or operands are transferred and processed via a plurality of multistage registers. Each stage of the register represents a power of the arbitrarily designated radix of the register, and the modulus of the register is the radix raised to the power equal to the number of stages in the register. For example, in a binary computing device using the "1's" complement notation a six stage register has a modulus of $2^6$ with the lowest digit order stage or least significant stage of the register containing a signal representation of the binary multiple of $2^0$, the signal representation in the second lowest digit order stage indicating a binary multiple of $2^1$ and so on up to the highest digit order or most significant stage of the register which indicates a binary multiple of the $2^5$. For use with operands in floating-point format the registers must comprise a number of stages for holding the signal representations of the mantissa portion of the data word and an additional number of stages for holding the signal representations of the characteristic portion of the data word. Although the entire operand is contained in a single register the portion devoted to the mantissa is independent of that portion which contains the characteristic so that each portion of the word can be handled independently. In addition to stages containing the mantissa and the characteristic, the register has an additional stage to indicate the sign of the mantissa, that is, whether it is negative or positive. This sign-indicating stage can be ignored in the following description since it is not pertinent to the instant invention.

For practical reasons the size of registers utilized in a computing device must be limited. The choice of size *is* arbitrary with the word size varying considerably. It is obvious that in performing arithmetic operations on data words in the floating-point format that registers of greater size than those arbitrarily chosen to be predominant through the computing device must be utilized. For example, when adding two floating-point operands with different characteristics, it is necessary to shift one of the words in order to obtain the proper arithmetic point alignment of the two words before adding the two mantissas. This requires an effective extension of the registers in size to have stages in which to shift the mantissas. Additionally, if one of the mantissas has been shifted prior to the addition the result of the addition will exceed the arbitrarily chosen register size and therefore extended registers must be utilized to handle the result of the addition. Unless round-off procedures are incorporated, the multiplication of two floating-point operands having equal size mantissas will produce a product that is twice the length of the original mantissas or one bit less than twice. Because of the foregoing it is common practice to use double length registers in the arithmetic section of a floating-point computing device. In this manner the result of an arithmetic operation on floating-point data words would appear in two different registers with one register being actually an extension of the first register and thereby attaining a double-length answer. As is well known in the art, a double-length result is utilizable to obtain double precision arithmetic. Since this result must subsequently be handled by the computing device via registers of the arbitrarily chosen length, each portion of the result must be thereafter treated as a separate data word or operand having its own mantissa and its own characteristic. One portion of the double-length result is designated as the most significant portion, since it is developed from the arithmetic operations which are performed on the most significant or highest order digits of the original mantissas. The other portion of the double-length result is designated as the least significant portion of the result since it is developed from the arithmetic operations performed on least significant or lowest order digits of the two original mantissas. Since the two portions of the result are actually the result of a single arithmetic operation, the characteristic of the least significant half of the result must indicate the lesser significance.

In this invention, this is accomplished first by making the characteristic of the least significant portion of the result equal to the characteristic of the most significant portion less the number of stages in the register containing the mantissa of the most significant half of the result. The difference in the two characteristics thereby indicates the relative placement of the arithmetic point in the two portions of the result. As described hereinbelow, this invention provides for further modification of the characteristics as required.

In arithmetic systems, in order to maintain consistency, it is important to maintain an indication of the number of significant digits in the operands. This can best be explained by an example relative to a simple bookkeeping process. Assuming an accounting system is utilized wherein the monetary entries are of the dollar values only, that is, the cents portion of the entry is dropped, and if the cents portion is greater than 50 the unit dollar is increased by one or if the cents portion is less than 50 it is dropped without increasing the unit portion of the dollar entry. In this manner only the dollar entries and above are significant since any cents entry is meaningless. If a further entry was made containing both dollars and cents and the two entries were summed, only the summation of the units dollar entries and higher would be significant since the summation of the cents portion of one entry would be added to a meaningless cents portion of the first entry. In some systems this is further extended by dropping the units entries of the dollar portion and making the tens on up the only significant entries. It can be seen that in order to maintain consistency and true significance when summing up all the entries, all of the entries must be made on the same basis of significance. The connotation of the term significance as used and described to this juncture then can be summarized as being the importance or consequence of the digit (or groups of digits) in a number to the accurate representation of the magnitude of the number. Under this connotation the relationship of digit order to significance is readily apparent in that the highest order non-zero digit is of greater significance than lower order digits of a number. Furthermore, it is of course obvious that in a number all zero-valued digit orders of higher order than the highest non-zero digit order are not significant.

In the arithmetic sections of computing devices there are usually performed various operations which result in modification of the number of truly significant digits in the result of the arithmetic operation. For example, it is common practice to "normalize" the result of an arithmetic operation in binary computing devices. Normalizing is performed, for example, by shifting the contents of a register until the most significant bit position in the binary register contains a "1." In the floating-point format, of course, any shifting operations must be and are reflected in a modification of the characteristic associated with the shifted mantissa. Normalizing results in a change in the number of significant digits in the mantissa. Prior art devices which formed the result of an arithmetic operation in double-length registers performed the normalizing by treating the double-length result as a single data word and shifting the word as a single entity. After normalizing, if each portion of the result is given its own characteristic (the characteristic of the least significant portion of the result is, as described previously, equal to the characteristic of the most significant portion of the result less the number of stages containing the mantissa of the most significant portion of the result) the difference between the two characteristics of the portions of the result would always be a constant equal to the number of places containing the mantissa of the most significant portion of the result. Therefore, even though the characteristic is modified by a shifting operation in the normalizing step, it will not indicate a change in the number of significant digits, or what is commonly referred to as absolute significance, of the result.

In this invention operations in the arithmetic section of a computing device which cause modification of the absolute significance, that is, modification of the number of significant bits, of the result is reflected in the characteristic of the most significant portion of the result only. In this manner the difference between the characteristic of the most significant portion of the result and the least significant portion of the result can be utilized to indicate the *absolute* significance, that is, the total number of significant bits, of the result.

Therefore, it is an object of this invention to provide an improved floating-point arithmetic section for a computing device.

It is a further object of this invention to provide improved means for determining absolute significance of the result of arithmetic operations and floating-point arithmetic format.

Another object of this invention is to provide means for indicating change in the absolute significance of the double-length result of a floating-point arithmetic operation by modifying the characteristic of the most significant portion of the double-length result in accordance with a modification of the absolute significance as it occurs in said arithmetic operation.

These and other more detailed and specific objects will be disclosed in the course of the following specification, reference being had to the accompanying drawing, in which.

Figure 1:
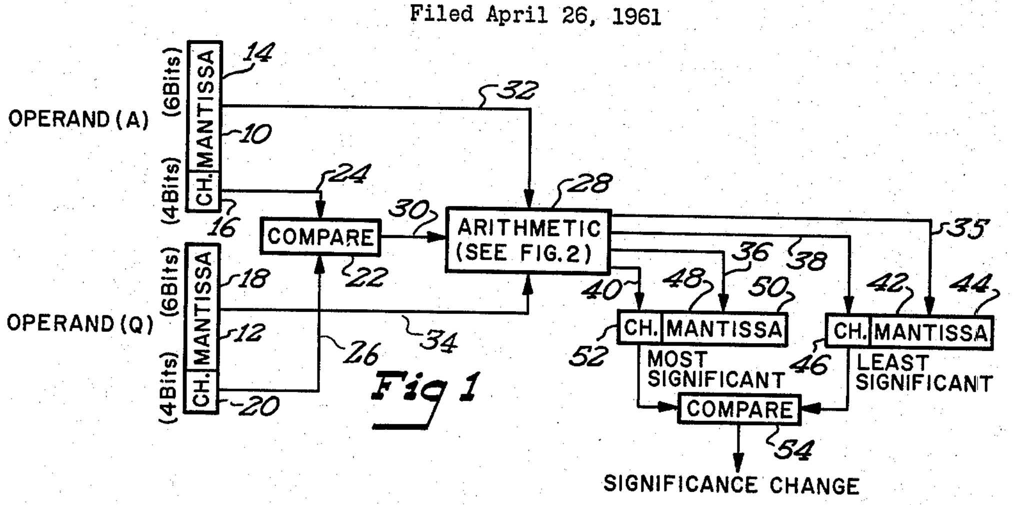
FIGURE 1 shows an embodiment of this invention.

The operation of one embodiment of this invention is best described by first referring to a few numerical examples of arithmetic operations. Hereinafter the description of this invention will be limited to binary computing devices, it being understood that the invention is not so limited. Addtionally, for ease of explanaton the data word or operand sizes will be limited to six digits, commonly called bits for binary numbers, of mantissa and four bits of characteristic. In the following examples in which two binary words are added together to obtain a resulting sum, each of the words to be added have a characteristic portion biased by decimal 8 or binary 1000. For purposes not pertinent to this description, this type of biasing is commonly used in floating-point operands. Additionally, the sign bit to indicate whether the operand is negative or positive is likewise not included in the examples since it does not affect significance and therefore is not pertinent to the explanation of the operation of the subject invention. It is understood that a sign bit is normally a part of the operand.

In the following examples the two operands in the floating-point format which are to be added are labelled A and Q. For ease of understanding and explanation, in all instances the Q operand has a smaller characteristic than A. In all the examples the grouping of the bits of the operands is such that the left-most four bits in the word comprise the characteristic and the right-most six bits comprise the mantissa. The right-most bit of the mantissa is the lowest order bit or the least significant bit whereas the left-most bit of the mantissa is the highest order bit or the most significant bit of the mantissa.

*Example 1*

In this example, two binary data words are added together with no change in the number of significant bits in the result.

| | | | | |
|---|---|---|---|---|
| (Q) | 1010 | 101000 | | |
| (A) | 1110 | 110100 | | |
| | | 000010 | 100000 | 1–1 (Q Right shifted four places) |
| | | 110110 | 100000 | 1–2 (Sum) |

The first step in performing addition of operands in floating-point format is to compare the characteristics of the two operands. Since the characteristic of A is equal to decimal 14 and the characteristic of Q is equal to decimal 10, the difference, decimal 4, designates the number of places that Q has to be shifted in order to perform the digit-by-digit alignment or binary point alignment of the two manitssas prior to performing the addition. Item 1–1 shows the mantissa of Q shifted right four places prior to addition to the mantissa of A. Item 1–2 shows the result of adding the shifted mantissa of Q to the mantissa of A.

As previously stated, since the data words are limited in size such that the mantissa cannot contain more than six bits and the characteristic contains only four bits, the resulting sum, item 1–2, comprises two separate portions, the left-most six bits containing the result of the addition of the most significant bits of the mantissas, the right-most six bits including the results of the addition of the least significant bits of the mantissas. As a further step in the arithmetic operation, the result of the addition is usually normalized. Normalizing is the process of shifting the result until the most significant bit of the result is a "1." In this example, since the result is already in this form, that is, the most significant bit of the result is a "1," no normalizing is required. Since each portion of the result must be treated as a separate data word of floating-point format, each is given its own characteristic. The characteristic of the most significant portion of the result is the larger of the characteristics of the two original data words which were added, which in this example is the characteristic of A. Therefore, the characteristic of the most significant portion of the result is equal to the characteristic of A. The characteristic of the least significant portion of the result is equal to the larger of the two original characteristics, the characteristic of A, less the number of places in the mantissa portion of the most significant portion of the result. Since the larger characteristic is decimal 14 and there are six digit positions in the mantissa of the most significant portion of the result, the characteristic of the least significant portion of the result is decimal 8 or binary 1000. The result of the addition in the floating-point format described is shown by item 1–3.

| ch. | mant. | ch. | mant. | |
|---|---|---|---|---|
| 1110 | 110110 | 1000 | 100000 | 1–3 |
| Most Significant | | Least Significant | | |

In this example since the difference between the two resulting characteristics is equal to decimal 6, it indicates that the absolute significance of the result, that is, the number of significant bits in the result, is the same as the absolute significance of the original data word which had the larger characteristic, operand A. The difference of the two characteristics of the result being equal to the constant decimal 6, which is the number of bits in the mantissa of the most significant portion of the result, indicates that the arithmetic operation has not caused any change in significance.

*Example 2*

This example shows the addition of two unnormalized data words and the subsequent normalizing of the result of the addition. Since normalizing affects the number of significant bits in a word, this example describes how the characteristics of the portions of the result of the addition are modified to indicate the number of significant bits remaining in the result.

```
(Q)        1010  001010
(A)        1100  001101
                 000010  100000  2-1
                 ______________
                 001111  100000  2-2
                   normalize
```

The first steps in this example are the same as the first two steps of Example 1 above. Since the characteristic of A is equal to decimal 12 and the characteristic of Q is equal to decimal 10, the mantissa of Q must be shifted two places to the right to obtain the proper binary point alignment prior to addition of the two mantissas. This is shown by item 2–1. As with Example 1, the addition is performed in the normal manner and the result is shown in item 2–2, wherein the result is divided into two portions, the left-most portion containing the most significant portion of the result and the right-most portion containing the least significant portion of the result.

Since the most significant bit of the result is a "0," normalizing is required. In this invention the normalizing is performed only on the most significant portion of the result, that is, only the most significant portion of the result is shifted until its most significant bit, a "1," is in the left-most position of the mantissa register. As described in Example 1, prior to normalizing the characteristic of the most significant portion of the result is set equal to the larger characteristic of the two operands which were originally added. Since the shifting operation in the normalizing process does affect the relative position of the binary point in the mantissa, this is reflected in the characteristic. As the most significant portion of the result is shifted to the left two places in order to make the most significant bit a "1," decimal 2 is subtracted from the characteristic of A. The resultant characteristic of the most significant portion of the result is equal to decimal 10 or binary 1010. The characteristic for the least significant portion of the result is obtained in the same manner as described in Example 1, that is, by subtracting from the characteristic of A the number of bits in the mantissa of the most significant portion of the result, making it decimal 6 (decimal 12 minus decimal 6) which is equal to binary 0110. The result in the floating-point format is shown by item 2–3.

| | | | | |
|---|---|---|---|---|
| 1010 | 11110 | 0110 | 100000 | 2–3 |

Since only the characteristic of the most significant portion of the result was modified by the shifting process in the normalizing step, the difference between the two characteristics of the result is now equal to decimal 4. This indicates that the number of significant bits in the result, that is, the absolute significance of the result, is four, and that during the arithmetic process significance was reduced by two bits. Since during the normalizing step the most significant portion of the result was shifted left two places, "0" 's were placed in the lower order two bits, making those two bits meaningless or not significant. In this manner, the characteristics of the result indicate the absolute significance of the result in addition to the placement of the arithmetic or binary point. In prior art computing devices the normalizing is performed on the entire result as a shingle entity, that is, the entire twelve bits of the result are shifted two places to the left and the characteristics of the shifted result would then differ by the constant 6. This does not indicate the effective loss of significance in the number of bits of the result causing the most significant portion of the result to be treated as a data word having six bits of significance rather than four bits of significance.

*Example 3*

In this example two unnormalized operands having absolute significance, or the number of significant bits, equal to six are added. The result is normalized and by comparison of the characteristics of the result, there is obtained an indication of a loss of significance.

```
(Q)  1011  001001
(A)  1100  001111
           000100  100000  3-1
           ______________
           010011  100000  3-2
             normalize
```

As with the previous two examples, the characteristics of the original data words, A and Q, are compared in the first step of the arithmetic operation. Since Q has a characteristic which is one less than the characteristic of A, the mantissa of Q is shifted one place to the right prior to to performance of the addition. This is shown by item 3–1. The addition is performed in the usual manner and the result thereof is shown in item 3–2, said result having a most significant portion and a least significant portion as previously described. The characteristic of the least significant portion of the result is equal to the characteristic of the larger word, A, less the number of digit positions containing the mantissa of the most significant portion of the result. As shown in item 3–3, the characteristic of the least significant portion of the result is equal to decimal 6 or binary 0110. Since the most significant portion of the result has a zero in the most significant position, it is normalized by shifting one place to the left and reducing the characteristic by one. The characteristic of the most significant portion of the result word is decimal 11 or binary 1011, as shown in item 3–3. The difference between the two characteristics of the result is decimal 5 thereby indicating that the result has 5 significant bits or an absolute significance of 5.

| 1011 \| 100110 | 0110 \| 100000 | 3–3 |
|---|---|---|

*Example 4*

In this example a positive number is added to a negative number with a resulting loss in significance, which is detected by the comparison of the characteristics of the two portions of the result.

| | | | |
|---|---|---|---|
| (Q) | 1100 111011 | | |
| (A) | 1101 100100 | | |
| | 011101 | 100000 | 4–1 |
| | 000111 | 100000 | 4–2 |
| | normalize | | |

Although the sign bit is not included in the data word for clarity, it will be assumed that Q has a sign bit indicating that it is negative. The addition of a negative word to the positive word, or subtraction of a positive word from another positive word, is performed in a similar manner to the previous examples. The characteristic of Q being one less than the characteristic of A, Q is shifted one place to the right prior to the addition. This is shown by item 4–1. The result of the addition is shown in item 4–2 comprising two portions similar to the previous examples. The least significant portion of the result is naturally a negative number, but again the sign bit which would indicate the negative quantity is omitted. Since the absolute quantity of the mantissa of the negative number, Q, is less than the absolute quantity of the mantissa of A, the most signficant portion of the result of the addition is a positive number. Similar to the previous examples the characteristic of the least significant portion of the word is made equal to the characteristic of A minus decimal 6, making it decimal 7, or binary 0111 as shown in item 4–3. Since the most significant portion of the result must be normalized by shifting it left three places, the characteristic of A is reduced by decimal 3 to obtain the characteristic of the most significant portion of the normalized result. This characteristic is decimal 10 or binary 1010 as shown in item 4–3. The difference between the two characteristics of the result is decimal 3, indicating three significant bits in the result or an absolute significance of 3.

| 1010 \| 111000 | 0111 \| 100000 | 4–3 |
|---|---|---|

Although the foregoing examples have been intended to show the advantages and features of this invention, it is understood that there are many more examples which could be utilized. Additionally, although in all given examples the original data words have maximum significance, that is, all positions in the mantissas are significant bit positions, it is possible that the original data words have less significance than six, i.e., the data word does not occupy every bit positon in a register. In those cases where the original data words have significance less than six, the difference between the characteristics of the results can be used to indicate if the significance of the answer is changed from the original significance and the amount of said change. In other words, if two operands, each having original significance of four are added and the difference between the two characteristics in the result is six, which is the constant used in these examples, the indication is that the significance has not changed and therefore the original significance of four has been retained in the result. If the difference in the characteristics of the result had been five instead of six, this is one less than the constant, the indication is that the characteristic of the result is one less than the original significance and therefore the number of bits having significance in the answer is three rather than four.

An exemplary mechanization of the above examples is described in FIGURE 1 wherein a first operand A is transmitted to a first flip-flop register 10 and the second operand Q is transmitted to flip-flop register 12. Each of these registers is identical and consists of six bistable stages for storing the mantissa portion of the operand and four bistable stages for storing the characteristic portion of the operand. Those stages for storing the mantissa of operand A are grouped as item 14 and those stages containing the characteristic of operand A are grouped as item 16. Those stages storing the mantissa of operand Q are grouped as item 18 and the characteristics storage stages for operand Q are grouped as item 20. As is well known in the art, there are a large variety of binary registers which can be used for the purposes of storing these data words. Preferably each stage of the registers is a transistorized flip-flop which provides an output signal indicating the state of the stage, that is, whether the stage is in the "0" state or the "1" state. Although throughout this description reference is made to mantissas and characteristics and bits, it is understood that these terms are used as being the equivalent of the signal representations that are actually used in the computing device to indicate these various quantities. In other words, when referring to the mantissa being stored in the register 10, it is understood that each stage in the register actually contains a signal representation of the corresponding bit of the mantissa. Since only two different signal representations are required for binary numbers, it is common practice to have the signal representations in the form of two different voltage levels, a first level indicating a "1" and a second level being indicative of "0," although no limitation thereto is intended.

The characteristic portion of operand A is transmitted from register 10 to the compare circuit 22 via transmission lines 24 and the characteristic of operand Q from register 12 is transmitted to the compare circuit 22 via lines 26. Although conductors 24 and 26 are shown as single conductors, it is understood that they can represent four separate conductors each carrying the signal representation of one of the four bits in each of the characteristic bit positions of register sections 16 and 20. In this way the characteristic can be transmitted to the compare circuit in a parallel manner, that is, all bits simultaneously. For serial transmission each of the bits would sequentially be transmitted over a single conductor to the compare circuit. Hereinafter the transmissions will all be considered to be in a parallel mode rather than in a serial fashion so that the single line transmission paths represent a plurality of lines, although it is understood that serial transmission of bit signals could likewise be utilized in this invention. The compare circuit 22 can be any circuit well known in the art, for example, a simple subtracting circuit in which one characteristic is subtracted from the other with a resulting difference. The result of the comparison is transmitted to the arithmetic section 28 via line 30, to be used in the arithmetic section to obtain proper digit-by-digit alignment of the two mantissas prior to the arithmetic function to be performed. The operand A mantissa from section 14 of register 10 is transmitted to the arithmetic section 28 via line 32 whereas the mantissa of operand Q is transmitted from section 18 of register 12 via line 34 to the arithmetic section 28. As with conductors 24 and 26, although conductors 32 and 34 are shown in the figure to be single lines, they can likewise represent multiple conductors such as six each for performing parallel transmission of the mantissa bits to the arithmetic section 28.

Figure 2:
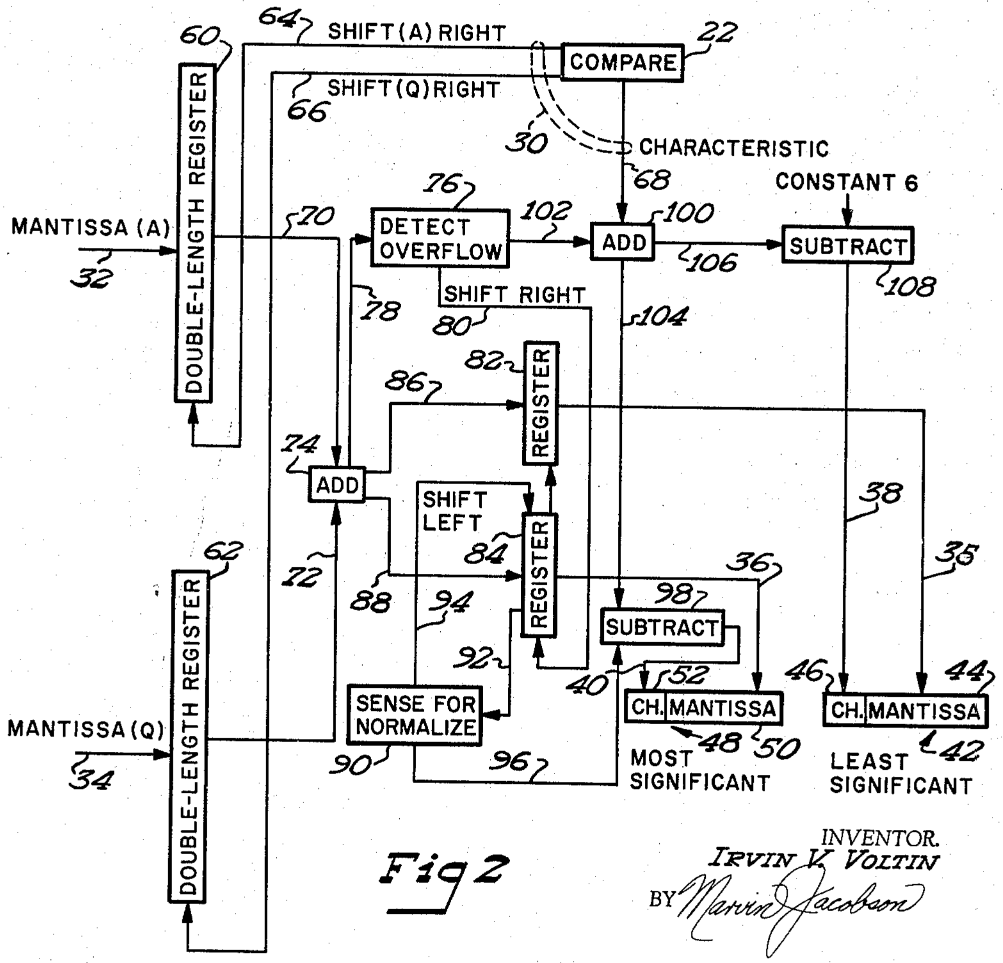
FIGURE 2 shows in more detail an embodiment of this invention.

As will be shown in more detail in FIGURE 2, in the arithmetic section 28 the digit-by-digit alignment of the two mantissas, that is, alignment of the binary points under control of the results of the comparison of the characteristics, is performed prior to the arithmetic operations on the mantissas. This is followed by the arithmetic operations on the mantissas, including any shifting steps that are required. In addition to the result of the comparison of the two characteristics in the compare circuit 22, line 30 can likewise be used to transmit to arithmetic section 28 the larger of the characteristics of the two original operands, A and Q, for use by the arithmetic section in determining the characteristic for the final result. Alternatively, of course, the larger characteristic could be transmitted to the arithmetic section over a separate path not shown in FIGURE 1.

The arithmetic section 28 performs the arithmetic operations on the mantissa portions of the original operands after said mantissas have first been aligned digit-by-digit, that is, after the relative alignment of the binary points has been preformed, and the result of the arithmetic operation on the mantissas appears on lines 35 and 36. As will be shown in more detail in FIGURE 2, the modification of the characteristic to provide the characteristic for the final result is also performed in the arithmetic section 28. The characteristics for the final result appear on lines 38 and 40, from arithmetic section 28. It should be understood that the method of transmitting the information to the arithmetic section is not considered a part of this invention and there are a variety of ways of performing that function. This invention provides a novel means for handling the results of the arithmetic operations in order to achieve an improved floating-point arithmetic operation.

Because of the previously assumed size limitation placed on the registers used in this exemplary embodiment, the output of the arithmetic section 28 is transmitted to two registers 42 and 48. Each of said registers may be of a type identical to the storage registers 10 and 12. Storage register 42 contains six bits, grouped as item 44, for storing a mantissa portion, and four bits grouped as item 46 for storing a characteristic portion. Register 48 likewise has a section group as item 50 containing six bits of mantissa and a section itemized 52 for containing four bits of characteristic. The least significant portion of the result from the arithmetic section 28 is transmitted via lines 35 to the mantissa section 44 of the register 42. The characteristic of the least significant portion of the result, as determined by the arithmetic section 28, is transmitted to section 46 of register 42 via line 38. The most significant portion of the result of the arithmetic operation performed on the mantissas by the arithmetic section 28 is transmitted to section 50 of register 48 via line 36 whereas the characteristic of the most significant portion of the result appears via line 40 at section 52 of register 48. Since the two characteristics of the result have been modified as required prior to transmission to sections 46 and 52 of registers 42 and 48 respectively, these characteristics are compared in compare circuit 54 to indicate whether or not there has been a change in the significance of the result, and, if so, the amount of said change. The numeric quantities used in Example 4 described above can be utilized to describe in more detail the operation of the circuit of FIGURE 1.

The characteristic operation of operand A is placed in section 16 of register 10 while the characteristic portion of operand Q is placed in section 20 of register 12. The characteristics of A and Q are equal to decimal 13 and 12, respectively, or binary 1101 and 1100. The mantissa portion of operand A is stored in section 14 of register 10 while the mantissa portion of operand Q is stored in section 18 of register 12. The characteristic portion of operand A is transmitted from register 10 to compare circuit 22 via line 24 and the characteristic portion of operand Q is transmitted from register 12 to compare circuit 22 via line 26. As previously stated, although items 24 and 26 are shown in the figure as single conductors, it is understood that these represent a plurality of conductors for parallel transmission of the characteristics. All single conductors subsequently referred to in this description are considered as representing a plurality of conductors for parallel transmission of information, although serial transmission via single lines is also possible. As previously stated, compare circuit 22 can be any well known circuit for performing subtraction of the characteristics of the two operands. It is obvious that the result of the subtraction of one characteristic from the other would indicate which of the two characteristics is the larger and additionally indicate the amount by which they differ. This result is transmitted from compare circuit 22 to the arithmetic section 28 via line 30. The mantissa portions of the operands A and Q are transmitted to the arithmetic section 28 via lines 32 and 34 respectively. As will be described in more detail in reference to description of FIGURE 2, in the arithmetic section the mantissa of operand Q, being the operand with the smaller characteristic, is aligned digit-by-digit with the mantissa of operand A. This would appear in the arithmetic section as shown as item 4–1 in the Example 4 previously described. Additionally, the larger of the two characteristics of the original operands is likewise transmitted to arithmetic section over line 30. Since this example is an example of the addition of the mantissas of two operands, after the digit-by-digit alignment of the two mantissas, i.e., the binary point alignment, the arithmetic section performs the addition of the two mantissas and provides a sum as shown in item 4–2. The portion of the sum resulting from the addition of the least significant bits of the mantissas is transmitted from the arithmetic section 28 to the mantissa portion 44 of register 42 via line 35. In the arithmetic section, as will be shown in more detail in the description of FIGURE 2, the number of bit positions containing the portion of the result of adding the most significant bits of the mantissas, which in this example is assumed to be a constant decimal 6, is subtracted from the larger of the two original characteristics, the characteristic of A. The resulting difference, decimal 7, or binary 0111, is transmitted to the characteristic portion 46 of register 42 via line 38. Additionally, the arithmetic section contains means for normalizing the sum. As previously described, normalizing is the process of shifting the information until the most significant bit position contains a "1." In this example since the three most significant bits in the resulting item 4–2 are zeros, the information must be shifted to the left three places. Only that portion of the sum resulting from the addition of the most significant bits of the original mantissas is normalized. In the arithmetic section the number of places shifted in order to normalize is subtracted from the larger of the two original characteristics, that is, the characteristic of operand A which is equal to decimal 13. The resulting characteristic is then equal to decimal 13 minus decimal 3 to provide a characteristic of decimal 10 or binary 1010. The normalized sum is then transmitted from arithmetic section 28 to mantissa section 50 of register 48 via line 36 and the modified characteristic is transmitted to characteristic section 52 of register 48 via line 40. The information contained in the two registers 48 and 42 will therefore be the same as that information which is shown as the numeric quantity in item 4–3. The characteristics in each of the registers 48 and 42, the former representing the characteristic of the most significant portion of the result and the latter representing the characteristic of the least significant portion of the result, is then transmitted to compare circuit 54. This compare circuit can be similar to compare circuit 22 which is a means for subtracting one characteristic from the other. The result of this comparison indicates the change in significance of the answer, that is, the change between the absolute significance of the original operands, and the result of the arithmetic operations.

FIGURE 2 shows in more detail the arithmetic section 28 of FIGURE 1. The items in FIGURE 2 that are common to both figures are labeled in FIGURE 2 as they are in FIGURE 1. Register 60 and 62 receive the mantissas of the operands A and Q respectively from section 14 of register 10 in FIGURE 1 and section 18 of register 12 via lines 32 and 34. In this embodiment registers 60 and 62 are shown as double-length registers, i.e., they each have twice the capacity of registers 10 and 12 of FIGURE 1. Although preferably these registers would be multistages transistorized registers, i.e., each stage being a transistorized flip-flop circuit, there are of course many circuits well known in the art which can be used for registers 60 and 62. In addition to the storage capabilities of registers 60 and 62, they also have shifting properties, i.e., the information that is stored in the registers can be shifted selectively a number of places to the right. This property again is well known in the art and only requires that the output of one flip-flop serve as an input to the next adjacent right flip-flop under selective control of a shifting signal.

As previously stated in regard to the description of FIGURE 1, conductor 30 in FIGURE 1, although shown to be a single conductor could actually represent a group of conductors. In FIGURE 2 it is shown that the lines 64, 66 and 68 as a group comprise the equivalent of line 30 in FIGURE 1. Compare circuit 22, as previously described, may be any well-known subtractive circuit in which the characteristic of one of the operands is subtracted from the characteristic of the other operand. Depending on the result of the comparison, a signal is developed on line 64 or line 66 to cause the contents of the corresponding double-length register, 60 or 62 respectively, containing the mantissas of the operands to shift a certain number of places to the right. Also, as a result of the compare operation in compare circuit 22, signal representations of the larger of the two original characteristics appear on line 68. After the selective shifting, for proper binary point alignment, the mantissas in register 60 and 62 are transmitted to add circuit 74 via lines 70 and 72 respectively. Add circuit 74 may be of a type well-known in the art and comprises a full adder for adding the two mantissas which are transmitted thereto. For greater speed in operation, of course, the addition is preferably in a parallel mode, although it is obvious that serial addition or some combination of serial and parallel addition can be utilized.

Most adder circuits include well-known means for detecting the occurrence of an overflow resulting from the addition of two numbers. In the addition of two numbers each containing $m$ digits, it is possible that the answer or the sum has $m+1$ digits indicating that there has been a carry developed from the addition of the two most significant bits in the two numbers being added. This is referred to as an overflow. In this embodiment the overflow is handled in the normal manner of shifting the result of the addition so that the overflow bit then becomes the most significant bit in the sum. Detect overflow circuit 76 monitors the addition circuit 74 by line 78 and upon detection of an overflow provides a signal on shift right line 80. In this embodiment where the arithmetic function being performed is an addition of two data words, i.e., the addition of the mantissas of two operands, the resulting sum is transmitted from add circuit 74 to registers 82 and 84 by lines 86 and 88 respectively. Each of said registers 82 and 84 contain, respectively, the least significant portion of the sum and the most significant portion of the sum. In this embodiment, these registers are preferably of equal size and each is equal to a single length so that together they comprise a double-length register of the same size as registers 60 and 62. These registers can be of the same variety as registers 10 and 12 having storage capabilities with each stage being a transistorized flip-flop. In addition to the storage capabilities of registers 82 and 84, they also have shifting capabilities similar to those of double-length registers 60 and 62.

The occurrence of a shift right signal on line 80 from detect overflow circuit 76 is transmitted to registers 84 and 82 to cause the contents of these registers to shift as one double-length register one place to the right as the result of the detection of an overflow from the sum of the two mantissas by add circuit 74.

As previously described, a normalizing function occurs in the arithmetic section in order to make the most significant bit of the result of the addition a "1." Sense for normalize circuit 90 obtains a signal on line 92 which is monitoring the most significant bit in register 84. As long as the most significant bit in register 84 is a zero, circuit 90 provides a shift left signal on line 94. This shift left signal is fed to the register 84 to cause the contents thereof to shift left until line 92 senses that the most significant bit position in register 84 contains a "1." It should be noted that the left shift is performed only on the register 84 as a single register, unlike the right shifting due to overflow when the combination of registers 84 and 82 was considered as a single double-length register. In this manner, the normalizing is performed solely on the contents of register 84. It is obvious, of course, that if the detect for overflow resulted in a shift right signal on line 80, normalizing would not be required since the most significant bit in the sum would have to be a "1." Sense for normalize circuit provides another output signal on line 96 each time a left shift is required for the normalizing function. The signal on line 96 is fed to subtract circuit 98.

As previously described, as a result of the comparison by compare circuit 22, the signal representation of the larger of the two original characteristics appears on line 68 and is transmitted to add circuit 100. In addition to the shift right signal on line 80, detect overflow circuit 76 provides a signal representing a right shift on line 102 for transmission to add circuit 100. Add circuit 100 is an adder for incrementing the characteristic by one upon the detection of an overflow by detect circuit 76. This incrementation is required, of course, since the resulting sum is shifted right one place and the result of this shift must be indicated in the characteristic of the resulting sum. The characteristic, as incremented by add circuit 100, is transmitted over line 104 to subtract circuit 98 and via line 106 to subtract circuit 108. Each of these subtract circuits can be of any circuit well-known in the art and serve to reduce the characteristic by an amount depending upon the other input to the subtract circuit. In subtract circuit 98 the characteristic is reduced by the amount of the signal representation appearing on line 96, i.e., by the amount that the sum, that is, the most significant portion of the sum, must be left shifted for normalizing. As previously stated, of course, if the characteristic appearing on line 68 is incremented by add circuit 100 due to a detection of overflow, there will be no subtraction performed in subtract circuit 98 since the result will have had to be in its normalized form. The result of the subtraction by subtract circuit 98 is transmitted to section 52 of register 48 via line 40. Additionally, the result of the sum of the mantissas appearing in register 84 is transmitted to section 50 of register 48 via line 36. This would be the normalized result. Subtract circuit 108 is likewise any well-known subtraction circuit in which the incremented characteristic, if there had been an overflow detected, is reduced by a constant equal to the number of places in the mantissa of the most significant portion of the result of the addition. This reduced characteristic is transmitted to section 46 of register 42 via line 38, whereas the result of the addition of the mantissas, i.e., the portion of the result resulting from the addition of the least significant portions of the mantissas, is transmitted from register 82 to section 44 of register 42 via line 35.

Example 4 which was utilized to more fully describe FIGURE 1 can likewise be utilized to describe in more detail the operation of FIGURE 2.

Compare circuit 22 in FIGURE 1 receives the characteristics of the two operands A and Q via lines 24 and 26 respectively. In Example 4 the characteristic of operand A is equal to decimal 13 and the characteristic of operand Q is equal to decimal 12 so that the result of subtraction of the characteristic of Q from the characteristic of A in compare circuit 22 will provide a signal on line 66 indicating that the mantissa of Q should be right-shifted one place for proper binary point alignment prior to the addition. Although in this example the binary point alignment or digit-by-digit alignment of the two mantissas only requires a right shift of a single place, the embodiment shows registers 60 and 62 as double-length registers in order to provide for the maximum possible shifting required for binary point alignment. The content of register 62, the shifted quantity of the mantissa of Q, will then be as shown in item 4–1. After the binary point alignment has been accomplished, the mantissa of operand A is transmitted from register 60 via line 70 to add circuit 74 and the shifted mantissa of operand Q is transmitted from register 62 to add circuit 74 via line 72. The result of the addition would be the sum shown in item 4–2. The portion of the sum shown by the right-most six bits in item 4–2 is transmitted from add circuit 74 to register 82 via line 86 and the left-most six bits of item 4–2 resulting from the addition of the most significant bits of the original mantissas is transmitted from add circuit 74 to register 84 via line 88. Since in this example there is no overflow resulting from the addition of the two mantissas, no signal will occur on conductor 78 and therefore no shift right signal will occur as an output from detect overflow circuit 76 on line 80. However, a signal will appear on line 92 indicating that the most significant bit of the sum is a "0." This signal appearing as an input to sense for normalize circuit 90 will result in said circuit 90 providing a shift left signal on line 94, which is applied to register 84 to cause the contents of register 84 to shift left one bit position. As a result of the first left shift of the contents of register 84, the most significant bit of said register will still be a "0," and another signal will appear on line 92 causing the contents of register 84 to shift left another bit position. This will continue until the contents of register 84 has been shifted three places to the left so that the most significant bit position of register 84 contains a "1."

The large of the two characteristics which is transmitted from compare circuit 22 to add circuit 100 via line 68 is the characteristic of A which is equal to decimal 13. Since there is no overflow in the example being described the output of add circuit 100 on line 104 is equal to decimal 13 and is transmitted to subtract circuit 98 as well as to subtract circuit 108 via line 106. For each left shift of the contents of register 84 by the left shift signal on conductor 94 a signal is transmitted from sense for normalize circuit 90 via line 96 to subtract circuit 98. Although the normalizing operation described previously is that of successive left shifts until the most significant bit becomes a "1," it is apparent that one shift of three places could be utilized in order to obtain a faster shifting operation and that a signal representing decimal 3 would be transmitted on line 96 to subtract circuit 98. In the latter subtract circuit the number of positions left shifted for normalizing, as indicated by the signal representation on line 96, is subtracted from the characteristic of A, decimal 13. The result of this subtraction, being decimal 10 or binary 1010, is transmitted via line 40 to the characteristic portion 52 of register 48. Simultaneously the left-shifted contents of register 84 is transmitted to the mantissa portion 50 of register 48 via line 36 so that the contents of register 48 is as shown by the leftmost ten bits of item 4–3.

In subtract circuit 108 the constant, which in this embodiment and example is equal to decimal 6, is subtracted from the characteristic of A which appears on line 106 to result in an output on line 38 which is equal to decimal 7 or binary 0111. This appears in the characteristic portion 46 of register 42. The contents of register 82, which is equal to the result of the addition of the least significant portions of the mantissas, is transmitted to the mantissa portion 44 of register 42 via line 35. Therefore, the contents of register 42 is that as shown in the rightmost ten bits of item 4–3 in Example 4. Register 48 contains the most significant portion of the sum and register 42 contains the least significant portion of the sum along with their corresponding characteristics. As previously stated, the comparison of these two characteristics is then utilized to indicate the absolute significance of the result.

It should be understood that there is a need for various timing controls in the operation of this invention, but said timing controls are not shown for the sake of clarity. It is obvious that said timing controls can be easily incorporated into this invention in order to control the proper sequential operation of the various steps in the invention.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. In a digital computer floating-point arithmetic system: an arithmetic circuit for operating on at least one number and for generating a floating-point arithmetic result; first storage register means including means for storing the most significant portion of said result; second storage register means including means for storing the remaining portions of said result; means for generating a characteristic for said result; means for detecting a change in the number of significant digits in said result, as compared to said one number, effected by said arithmetic operation; and means for modifying said result characteristic in accordance with said detected change in significance.

2. In a digital computer floating-point arithmetic circuit: an arithmetic circuit for operating on at least one number and for generating a floating-point arithmetic result; first multiple stage storage register means including stages for storing the most significant portion of said result; second multiple stage storage register means including stages for storing the remaining portions of said result; means for generating a characteristic for said result; means for detecting a change in the number of significant digits, as compared to said one number, in said result caused by said arithmetic operation; first means for modifying said result characteristic by said change in significant digits; second means for modifying said result characteristic by the number of stages for storing said result portions; said first storage register means further including stages for storing the characteristic modified by said first modifying means and said second storage register means further including stages for storing the characteristic modified by said second modifying means.

3. A circuit for use with a floating-point adder circuit, comprising: first N stage shiftable storage register means responsive to the adder circuit for storing the most significant half of the sum of the mantissas; second N stage storage register means responsive to said adder circuit for storing the least significant half of said sum; means for sensing the most significant bit of said first register means and for shifting the contents of said first register means a number of stages until said most significant bit is of a first predetermined value; means for generating a characteristic for said sum; first subtracting means responsive to said sensing means for subtracting from said sum characteristic the number of stages so shifted; third register means including N stages for storing the shifted contents of said first register means and M stages for storing said first subtracted characteristic; second subtracting means for subtracting N from said sum characteristic; fourth storage register means including N stages for storing the contents of said second register means and M stages for storing said second subtracted characteristic.

4. For use in a digital computer floating-point arithmetic system, the improvement comprising: storage register means for storing the most significant portion of the result of arithmetic operations performed on the mantissas of the operands; storage register means for storing the lesser significant portions of said result; means for generating a different characteristic for each of said portions including means for modifying the characteristic of said most significant portion by an amount equal to the change in the number of significant digits in said result, as compared to at least one of the operands, effected by said arithmetic operations; and further storage register means associated with each of said portion-storage register means for storing the corresponding different characteristics.

5. A circuit as in claim 4 wherein said characteristic generating means further includes means for modifying the characteristic of said lesser significant portions by the number of stages in said most significant portion storage register means.

6. A digital computer floating-point arithmetic circuit for performing arithmetic operations on operands, comprising: means for performing arithmetic operations on the mantissas of the operands; first means for storing the most significant portion of the result of said arithmetic operations; additional means for storing the lesser significant portions of said result; means for comparing the characteristics of said operands; means responsive to said comparing means for generating a characteristic for each of said result portions; means for detecting change in the number of significant digits in said result, as compared to said operands, effected by said arithmetic operations; and means for modifying the characteristic of said most significant portion by said detected change in significant digits.

7. For use with a digital computer floating-point arithmetic circuit which includes a mantissa adder circuit and a characteristic comparator circuit: N stage register means responsive to said mantissa adder circuit for storing the most significant portion of the resulting sum; second means responsive to said mantissa adder circuit for storing the least significant portion of said resulting sum; means responsive to said characteristic comparator circuit for developing a characteristic for said resulting sum; first means for modifying said characteristic by N; means responsive to said first modifying means for storing said first modified characteristic; means for detecting change in the number of significant digits in said resulting sum as compared to the original mantissas, effected by said adder circuit; second means for modifying said characteristic by an amount equal to said detected change in significant digits; and means responsive to said second modifying means for storing said second modified characteristic.

8. For use with a floating-point arithmetic circuit which operates on at least one floating-point operand and generates a floating-point result consisting of a mantissa and a characteristic, in combination: means coupled to the arithmetic circuit for detecting a change in the number of significant digits in the mantissa of said result, as compared to the mantissa of said one operand, caused by the arithmetic operation; means for modifying the result characteristic by said change in significant digits; first storage register means including N stages for storing the most significant half of the result mantissa and M stages for storing said modified result characteristic; means for subtracting N from said result characteristic; and second register means including N stages for storing the less significant half of said result mantissa and M stages for storing said subtracted characteristic.

References Cited by the Examiner

UNITED STATES PATENTS 2,951,637 9/60 Lind ---------------- 235—159

OTHER REFERENCES

"Significant Digit Computer Arithmetic," by N. Metropolis and R. L. Ashenhurst (U. Chicago); IRE Transactions, vol. EC–7, December 1958, pp. 265–267.

MALCOLM A. MORRISON, *Primary Examiner.*

WALTER W. BURNS, Jr., *Examiner.*

UNITED STATES PATENT OFFICE
CERTIFICATE OF CORRECTION

Patent No. 3,193,669 July 6, 1965

Irvin V. Voltin

It is hereby certified that error appears in the above numbered patent requiring correction and that the said Letters Patent should read as corrected below.

Column 4, line 17, for "explanaton" read -- explanation --; line 61, for "manitssas" read -- mantissas --; column 5, line 13, for "char" read -- char- --; column 6, line 14, for "1010 | 11110" read -- 1010 | 111100 --; line 31, for "shingle" read -- single --; same column 6, line 59, strike out "to"; column 9, line 37, for "group" read -- grouped --; line 59, for "operation" read -- portion --; column 13, line 47, for "large" read -- larger --.

Signed and sealed this 7th day of December 1965.

(SEAL)
Attest:

ERNEST W. SWIDER
Attesting Officer

EDWARD J. BRENNER
Commissioner of Patents